United States Patent
Xie et al.

(10) Patent No.: US 11,714,879 B2
(45) Date of Patent: Aug. 1, 2023

(54) METHOD AND DEVICE FOR BEHAVIOR CONTROL OF VIRTUAL IMAGE BASED ON TEXT, AND MEDIUM

(71) Applicant: TENCENT TECHNOLOGY (SHENZHEN) COMPANY LIMITED, Shenzhen (CN)

(72) Inventors: Jing Xie, Shenzhen (CN); Piji Li, Shenzhen (CN); Hong Duan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 129 days.

(21) Appl. No.: 17/480,112

(22) Filed: Sep. 20, 2021

(65) Prior Publication Data

US 2022/0004825 A1 Jan. 6, 2022

Related U.S. Application Data

(63) Continuation of application No. PCT/CN2020/113147, filed on Sep. 3, 2020.

(30) Foreign Application Priority Data

Sep. 23, 2019 (CN) .......................... 201910898521.6

(51) Int. Cl.
*G06V 30/40* (2022.01)
*G06F 18/241* (2023.01)

(52) U.S. Cl.
CPC ............ *G06F 18/241* (2023.01); *G06V 30/40* (2022.01); *G06V 30/43* (2022.01)

(58) Field of Classification Search
CPC ....... G06F 18/241; G06V 30/40; G06V 30/43
See application file for complete search history.

(56) References Cited

U.S. PATENT DOCUMENTS

| | | | | |
|---|---|---|---|---|
| 4,726,065 A | * | 2/1988 | Froessl ................... | G06F 3/167 704/275 |
| 5,151,998 A | * | 9/1992 | Capps .................. | G11B 27/034 704/278 |

(Continued)

FOREIGN PATENT DOCUMENTS

| CN | 102737397 A | 10/2012 |
|---|---|---|
| CN | 103761963 A | 4/2014 |

(Continued)

OTHER PUBLICATIONS

Fried et al., "Text-based Editing of Talking-head Video" (pp. 68:1-68:14) (Year: 2019).*

(Continued)

*Primary Examiner* — Manav Seth
(74) *Attorney, Agent, or Firm* — Anova Law Group PLLC

(57) ABSTRACT

A method and device for behavior control of a virtual image based on a text, and a medium are disclosed. The method includes inserting a symbol in a text, and generating a plurality of input vectors corresponding to the symbol and elements in the text; inputting the plurality of input vectors to a first encoder network, and determining a behavior trigger position in the text based on an attention vector of a network node corresponding to the symbol; determining behavior content based on a first encoded vector that is outputted from the first encoder network and corresponds to the symbol; and playing an audio corresponding to the text, and controlling the virtual image to present the behavior content when the audio is played to the behavior trigger position.

20 Claims, 9 Drawing Sheets

(56) References Cited

U.S. PATENT DOCUMENTS

| | | | | | |
|---|---|---|---|---|---|
| 5,664,061 | A | * | 9/1997 | Andreshak | G06F 3/16 704/E15.04 |
| 5,832,428 | A | * | 11/1998 | Chow | G10L 15/1815 704/E15.024 |
| 5,907,825 | A | * | 5/1999 | Tzirkel-Hancock | G10L 15/063 704/256.2 |
| 6,133,904 | A | * | 10/2000 | Tzirkel-Hancock | G06F 3/167 345/157 |
| 6,270,402 | B1 | * | 8/2001 | Fujioka | A63F 13/828 463/2 |
| 8,842,136 | B2 | * | 9/2014 | Kuo | G06F 3/0237 715/788 |
| 10,142,276 | B2 | * | 11/2018 | Rapaport | H04N 21/8358 |
| 10,642,939 | B2 | * | 5/2020 | Toplyn | G10L 15/26 |
| 10,878,817 | B2 | * | 12/2020 | Toplyn | G06F 40/40 |
| 11,023,688 | B1 | * | 6/2021 | Holmdahl | A63F 13/533 |
| 11,030,238 | B2 | * | 6/2021 | Dimson | G06F 16/5838 |
| 11,077,367 | B1 | * | 8/2021 | Thacker | G06N 20/00 |
| 11,170,774 | B2 | * | 11/2021 | Jang | G06F 3/167 |
| 11,275,907 | B2 | * | 3/2022 | Tu | G06N 3/045 |
| 11,314,951 | B2 | * | 4/2022 | Kim | G06F 40/40 |
| 11,386,625 | B2 | * | 7/2022 | Hu | G06F 3/04842 |
| 11,604,981 | B2 | * | 3/2023 | Tripathi | G06N 3/08 |
| 11,607,610 | B2 | * | 3/2023 | Huang | A63F 13/2145 |
| 11,610,067 | B2 | * | 3/2023 | Yang | G06N 3/042 |
| 2014/0356822 | A1 | * | 12/2014 | Hoque | G09B 19/04 434/185 |
| 2018/0315415 | A1 | * | 11/2018 | Mosley | G10L 15/063 |
| 2019/0220474 | A1 | * | 7/2019 | Williams | G06F 16/353 |
| 2019/0258713 | A1 | | 8/2019 | Kiros et al. | |
| 2020/0334416 | A1 | * | 10/2020 | Vianu | G06N 3/044 |
| 2021/0304736 | A1 | * | 9/2021 | Kothari | G10L 15/26 |
| 2021/0344798 | A1 | * | 11/2021 | Ginwala | H04M 3/5183 |
| 2021/0365643 | A1 | * | 11/2021 | Agrawal | G06N 20/00 |
| 2022/0101011 | A1 | * | 3/2022 | Dela Rosa | G06V 20/20 |
| 2022/0180202 | A1 | * | 6/2022 | Yin | G06F 16/35 |

FOREIGN PATENT DOCUMENTS

| | | | | |
|---|---|---|---|---|
| CN | 104866101 | A | 8/2015 | |
| CN | 106653052 | A | 5/2017 | |
| CN | 107329990 | A | 11/2017 | |
| CN | 108595601 | A | 9/2018 | |
| CN | 109118562 | A | 1/2019 | |
| CN | 109783641 | A | 5/2019 | |
| CN | 110598671 | A | 12/2019 | |
| WO | 2019011968 | A1 | 1/2019 | |
| WO | WO-2019011968 | A1 * | 1/2019 | G06K 9/6267 |

OTHER PUBLICATIONS

The World Intellectual Property Organization (WIPO) International Search Report for PCT/CN2020/113147 dated Dec. 4, 2020 7 Pages (including translation).

Yiqiang Chen et al. "(Non-official translation:) Text-Driven Synthesis of Multimodal Behavior for Virtual Human," (Non-official translation:) The 7th Graduate Academic Conference of Computer Science and Technology, Held by Institute of Computing Technology, Chinese Academy of Sciences, Aug. 16, 2007 (Aug. 16, 2007). 7 pages.

Jacob Devlin et al., "BERT: Pre-training of Deep Bidirectional Transformers for Language Understanding," In Proceedings of the 2019 Conference of the North American Chapter of the Association for Computational Linguistics: Human Language Technologies, vol. 1 (Long and Short Papers), pp. 4171-4186. 2019. 16 pages.

Yoon Kim, "Convolutional Neural Networks for Sentence Classification," In Proceedings of the 2014 Conference on Empirical Methods in Natural Language Processing (EMNLP), pp. 1746-1751. 2014. 6 pages.

The European Patent Office (EPO) The Extended European Search Report for 207867870.6 dated May 27, 2022 12 Pages.

Chen Sun et al., "VideoBERT: A Joint Model for Video and Language Representation Learning," arXiv:1904.01766v1, Apr. 3, 2019. 13 pages.

Tao Xu et al., "AttnGAN: Fine-Grained Text to Image Generation with Attentional Generative Adversarial Networks," 2018 IEEE/CVF Conference on Computer Vision and Pattern Recognition, IEEE, Jun. 18, 2018 (Jun. 18, 2018), pp. 1316-1324. 9 pages.

* cited by examiner

| Corresponding existing live streaming expression ID | | Action ID | Expression ID | Emotion ID |
|---|---|---|---|---|
| 1 | Excited | 1, 2, 8, 10 | 2 | 1 |
| 2 | Exhilarated | 1, 2, 8, 10 | 2 | 1 |
| 3 | Laugh | 1, 2, 8, 10 | 2 | 1 |
| 4 | Happy | 1, 2, 8, 10 | 2, 4 | 1 |
| 5 | Joy (Delighted) | 1, 2, 8, 10 | 2, 4 | 1 |
| 6 | Grinning with squinting eyes | 1, 2 | 4 | 1 |
| 7 | Playful | 9, 10 | 4 | 1 |
| 8 | Energetic | 8 | 4 | 1 |
| 9 | Proud | 10 | 7 | 7 |
| 10 | Cool | 10 | 7 | 7 |
| 11 | Cute (Wink) | 2 | 4 | 1 |
| 13 | Smirk (smug) | 9, 10 | 5, 7 | 7 |
| 16 | Approval | 7 | 4 | 1 |
| 17 | Enthusiastic | 8 | 8 | 1 |
| 21 | Smile | 2 | 4 | 1 |
| 25 | Innocent (Acting cute) | 4 | 4 | 1 |
| 26 | Awkward | 3 | 1 | 5 |
| 27 | Disgusted | 4, 5, 6 | 7, 8, 9 | 5 |
| 28 | Anxious | 4 | 8 | 4 |
| 29 | Nervous (Serious) | 4 | 8 | 4 |
| 34 | Frustration | 3 | 8 | 5 |
| 37 | Disappointed | 4, 5, 6 | 7, 8, 9 | 3, 5 |
| 38 | Confused | 4 | 8 | 6 |
| 39 | Downcast | 4 | 9 | 3 |
| 40 | Weary | 5 | 9 | 3, 5 |

FIG. 7

METHOD AND DEVICE FOR BEHAVIOR CONTROL OF VIRTUAL IMAGE BASED ON TEXT, AND MEDIUM

RELATED APPLICATIONS

This application is a continuation of PCT Application No, PCT/CN2020/113147, filed on Sep. 3, 2020, which in turn claims priority to Chinese Patent Application No. 201910898521.6, entitled "METHOD AND DEVICE FOR BEHAVIOR CONTROL OF VIRTUAL IMAGE BASED ON TEXT, AND MEDIUM," filed with the China National Intellectual Property Administration on Sep. 23, 2019. The two applications are incorporated by reference in their entirety.

FIELD OF THE TECHNOLOGY

This application relates to the technical field of artificial intelligence (AI), and more specifically, to a method and device for behavior control of a virtual image based on a text, and a medium.

BACKGROUND OF THE DISCLOSURE

With the development of AI in various aspects, the public has gradually become dissatisfied with the application of only one AI capability in one application scenario. Therefore, the exploration of application scenarios of comprehensive AI capabilities is also advancing. In recent years, a virtual image has been mentioned by the public as a way of showing the comprehensive AI capabilities. The virtual image is a visible and adjustable virtual image body form that is shown on a computer screen by digitizing a human body structure through computer technology. The virtual image may be an image obtained based on a real person, or may be an image obtained based on a cartoon character. Both academia and industry are trying to construct in different ways a virtual image that can serve and entertain the public 24 hours a day.

SUMMARY

Embodiments of this application provide a method and device for behavior control of a virtual image based on a text, and a medium, which can control a virtual image to show an expression and an action that conform to a text and resemble a real person without being driven by a real person.

One aspect of this application provides a method for behavior control of a virtual image based on a text. The method includes inserting a symbol in a text, and generating a plurality of input vectors corresponding to the symbol and elements in the text, the symbol being a symbol used for representing text classification; inputting the plurality of input vectors to a first encoder network, the first encoder network comprising at least one layer of network nodes, and determining a behavior trigger position in the text based on an attention vector of a network node corresponding to the symbol, each element in the attention vector indicating an attention weight from the network node corresponding to the symbol to each network node in the same layer as the network node; determining behavior content based on a first encoded vector that is outputted from the first encoder network and corresponds to the symbol; and playing an audio corresponding to the text, and controlling the virtual image to present the behavior content when the audio is played to the behavior trigger position.

Another aspect of the present disclosure provides a device for behavior control of a virtual image based on a text. The device includes a vectorization apparatus, configured to: insert a symbol in a text, and generate a plurality of input vectors corresponding to the symbol and elements in the text, the symbol being a symbol used for representing text classification; a behavior trigger position determining apparatus, configured to: input the plurality of input vectors to a first encoder network, the first encoder network comprising at least one layer of network nodes, and determine a behavior trigger position in the text based on an attention vector of a network node corresponding to the symbol, each element in the attention vector indicating an attention weight from the network node corresponding to the symbol to each network node in the same layer as the network node; a behavior content determining apparatus, configured to determine behavior content based on a first encoded vector that is outputted from the first encoder network and corresponds to the symbol; and a behavior presentation apparatus, configured to: play an audio corresponding to the text, and control the virtual image to present the behavior content when the audio is played to the behavior trigger position.

Another aspect of the present disclosure provides a non-transitory computer-readable storage medium, storing machine-readable instructions, the machine-readable instructions, when executed by a processor, causing the processor to perform the foregoing method.

BRIEF DESCRIPTION OF THE DRAWINGS

FIG. 7 is an example of an expression mapping table according to some embodiments of this application.

DESCRIPTION OF EMBODIMENTS

Figure 1:
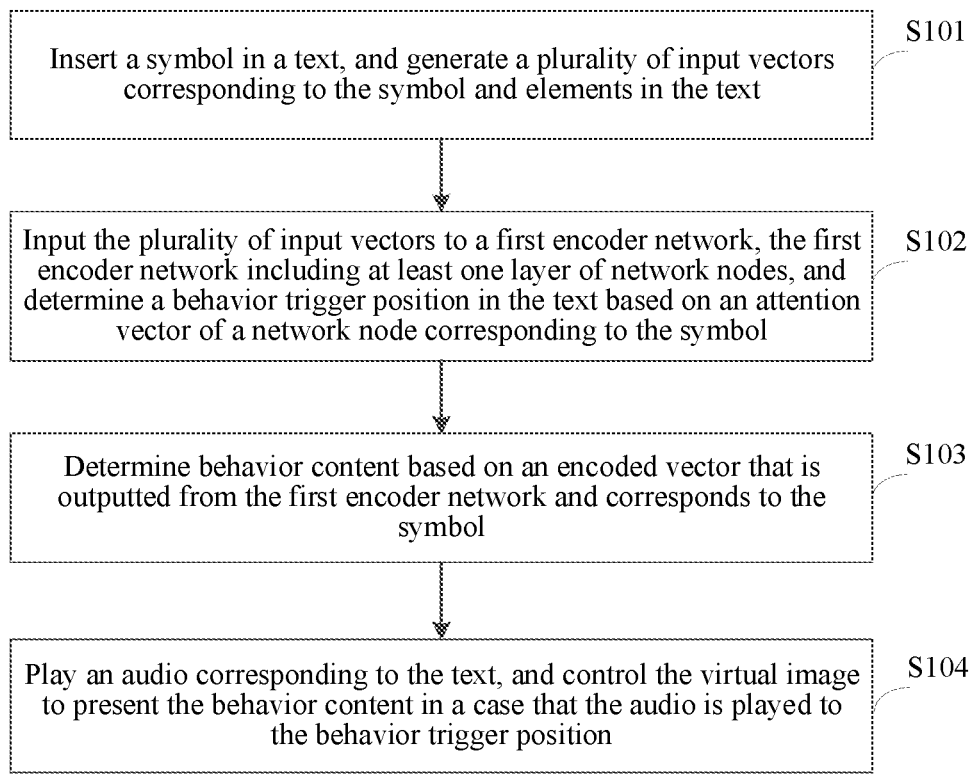
FIG. 1 is a flowchart of a specific process of a method for behavior control of a virtual image based on a text according to an embodiment of this application.

Implementations of this application are described below with reference to the accompanying drawings. The following description with reference to the accompanying drawings is provided to help understanding of the exemplary implementations of this application defined by the claims and equivalents thereof. The description includes specific details for helping understanding, but the specific details are only exemplary. Therefore, a person skilled in the art learns that, various changes and modifications may be made to the implementations described herein without departing from the scope and spirit of this application. In addition, to make this specification clearer and more concise, detailed descriptions of functions and constructions well known in the art are omitted.

AI is a theory, a method, a technology, and an application system that use a digital computer or a machine controlled by the digital computer to simulate, extend, and expand human intelligence, perceive an environment, obtain knowledge, and use knowledge to obtain an optimal result. AI software technologies mainly include several major technical areas such as a computer vision (CV) technology, a speech processing technology, a natural language processing (NLP) technology, and machine learning (ML)/deep learning (DL).

ML is a multi-disciplinary subject involving a plurality of disciplines such as probability theory, statistics, approximation theory, convex analysis, and algorithm complexity theory. ML specializes in studying how a computer simulates or implements a human learning behavior to obtain new knowledge or skills, and reorganize an existing knowledge structure, to keep improving performance of the computer. ML, as the core of AI, is a basic way to make the computer intelligent, and is applicable to various fields of AI. ML and DL generally include technologies such as an artificial neural network, a belief network, reinforcement learning, transfer learning, inductive learning, and learning from demonstrations.

The solutions provided in the embodiments of this application involve technologies such as ML of AI, and are specifically described by using the following embodiments.

Technical solutions for constructing a virtual image are mainly divided into two categories. One is a human-driven method. Specifically, data of the body and expressions of a real actor is captured by using an action capture device, and then the data is used to drive a 3D or 2D virtual image to show these actions and expressions. The other is a data-driven method. Specifically, a virtual image reads out an inputted text content in a manner of text to speech (TTS). However, the virtual image shows no expression and action. The method is only applicable to scenarios that rarely require expressions and actions, for example, news presentations.

These methods for driving a virtual image either have obvious human-driven traces, or lack personalized behaviors such as actions and expressions. It is difficult to control a virtual image based on a text to present behaviors that resemble a real person without being driven by a real person behind.

In a method and device for behavior control of a virtual image according to this application, instead of driven by a human, a virtual image is driven to present corresponding behaviors by data, thereby implementing uninterrupted operation and virtual image customization. In addition, different categories of data are extracted based on a text and is then mapped to behaviors of the virtual image, so that the triggered behaviors are conform to the current text and the behaviors are more varied. Moreover, the behavior presented by the virtual image is determined based on a predetermined mapping rule. Therefore, this application is highly extensible and can continuously provide more varied behavior contents. In addition, it is only necessary to update the mapping rule to enable the virtual image to present a new behavior.

A specific process of a method for behavior control of a virtual image based on a text according to an embodiment of this application is described with reference to FIG. 1. For example, a specific form of the virtual image may be an avatar image that is the same as a real person, or may be a completely virtual cartoon image. For example, in an application scenario of news presentation, the virtual image may be an avatar image that is the same as a real presenter. As a news presenter, the virtual image can not only generate a video for news presentation based on a text in a short time, but also ensure "zero error" in the presentation of news content. The virtual image can be quickly used for various scenarios and can present news uninterruptedly 24 hours a day, to improve the efficiency in media industry. Alternatively, in an application scenario of a virtual game, cartoon images of different game roles can show varied behaviors based on a text, and can uninterruptedly perform role tasks of the game roles 24 hours a day, such as 24-hour game commentary and 24-hour chatting.

As shown in FIG. 1, the method may be performed by an electronic device and includes the following operations:

S101: Insert a symbol in a text, and generate a plurality of input vectors corresponding to the symbol and elements in the text.

The text herein is usually a sentence. In some embodiments, the specific symbol may be a classification (CLS) symbol used for representing text classification. The specific symbol inserted in S101 may be an original vector corresponding to the CLS symbol. In addition, an insertion position of the specific symbol in the text may be arbitrary. For example, the specific symbol may be inserted before the text, or may be inserted after the text, or may be inserted in the middle of the text.

After the specific symbol is inserted, elements included in the text are segmented. For example, the elements may be words or phrases. That is, the text may be segmented by words. Alternatively, the text may be segmented by phrases. Then, the specific symbol and the elements in the text are converted into a series of vectors that can express semantics of the text. That is, the specific symbol and the elements in the text are mapped or embedded into another numerical vector space, to generate the plurality of corresponding input vectors.

S102: Input the plurality of input vectors to a first encoder network, the first encoder network including at least one layer of network nodes, and determine a behavior trigger position in the text based on an attention vector of a network node corresponding to the specific symbol. Each element in the attention vector of the network node corresponding to the specific symbol indicates an attention weight from the network node corresponding to the specific symbol to each network node in the same layer.

Figure 2:
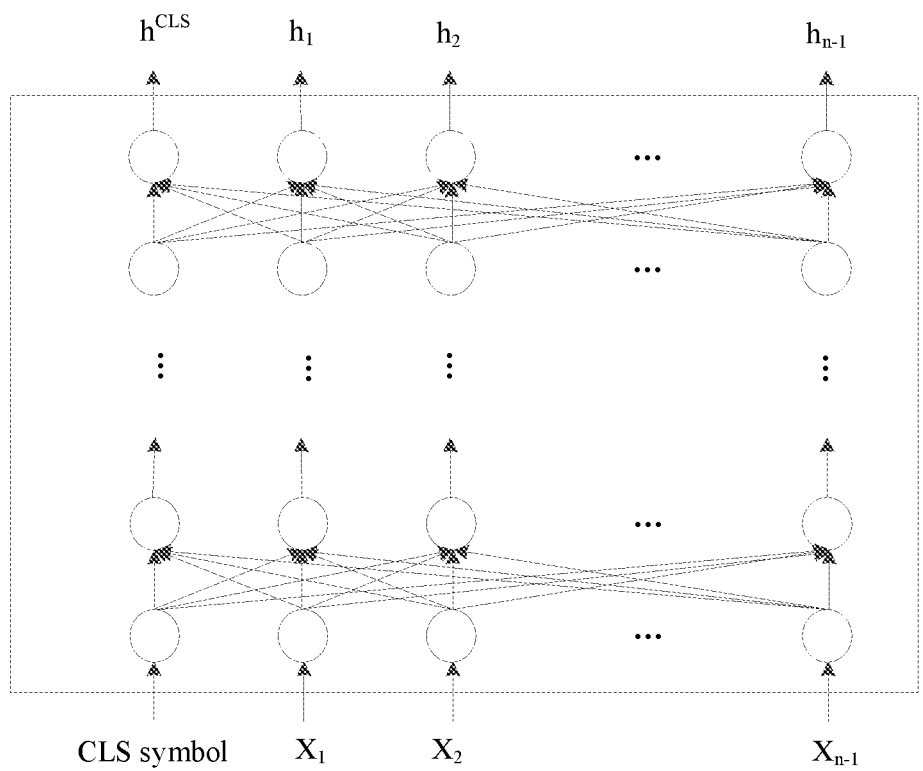
FIG. 2 is a schematic diagram of an internal structure of a first encoder network according to some embodiments of this application.

FIG. 2 is a schematic diagram of an internal structure of a first encoder network according to some embodiments of this application. For the first encoder network, an input is an original vector of each word/phrase/specific symbol obtained in S101, and an output is a vector representation of each word/phrase/specific symbol integrating full-text semantic information. For example, for the first network node in the first layer, a weighted sum of an input vector of the first element corresponding to the network node and input vectors of elements of a context of the first element is calculated as an encoded vector of the network node, and the encoded vector is provided as an input to the first network node in the second layer to the first network node in the last layer, to obtain a final first encoded output integrating full-text semantic information. In FIG. 2, the first encoder network includes a plurality of layers of network nodes.

Certainly, this application is not limited thereto. The first encoder network may alternatively include one layer of network nodes.

For example, in one embodiment, the first encoder network may be implemented by using a bidirectional encoder representations from transformer (BERT) model. A purpose of the BERT model is to obtain a semantic representation including varied semantic information of the text by using large-scale unlabeled corpus training, then fine-tune the semantic representation of the text in a specific NLP task, and finally apply the semantic representation of the text to the NLP task.

Therefore, for the BERT model, an input is an original phrase vector of each word/phrase in the text obtained in S101, and an output is a vector representation of each word/phrase in the text integrating full-text semantic information.

The BERT model is a model based on an attention mechanism. A main function of the attention mechanism is to allow a neural network to pay "attention" to a part of an input, that is, to distinguish between effects of different parts of the input on an output. The attention mechanism is understood from the perspective of enhancing the semantic representation of words/phrases.

The meaning of a word/phrase expressed in a sentence is usually related to a context thereof. For example, "versa" seems to be uncommon, but in the context "and vice versa", the word "versa" becomes immediately familiar. Therefore, contextual information of a word/phrase helps to enhance semantic representation of the word/phrase. In addition, different words/phrases in the context often play different roles in enhancing semantic representation. For example, in the foregoing example, the word "vice" has the greatest effect on the understanding of the word "versa", whereas the word "and" has the least effect. To distinguishingly use contextual word/phrase information to enhance semantic representation of a target word/phrase, the attention mechanism can be used.

Figure 3:
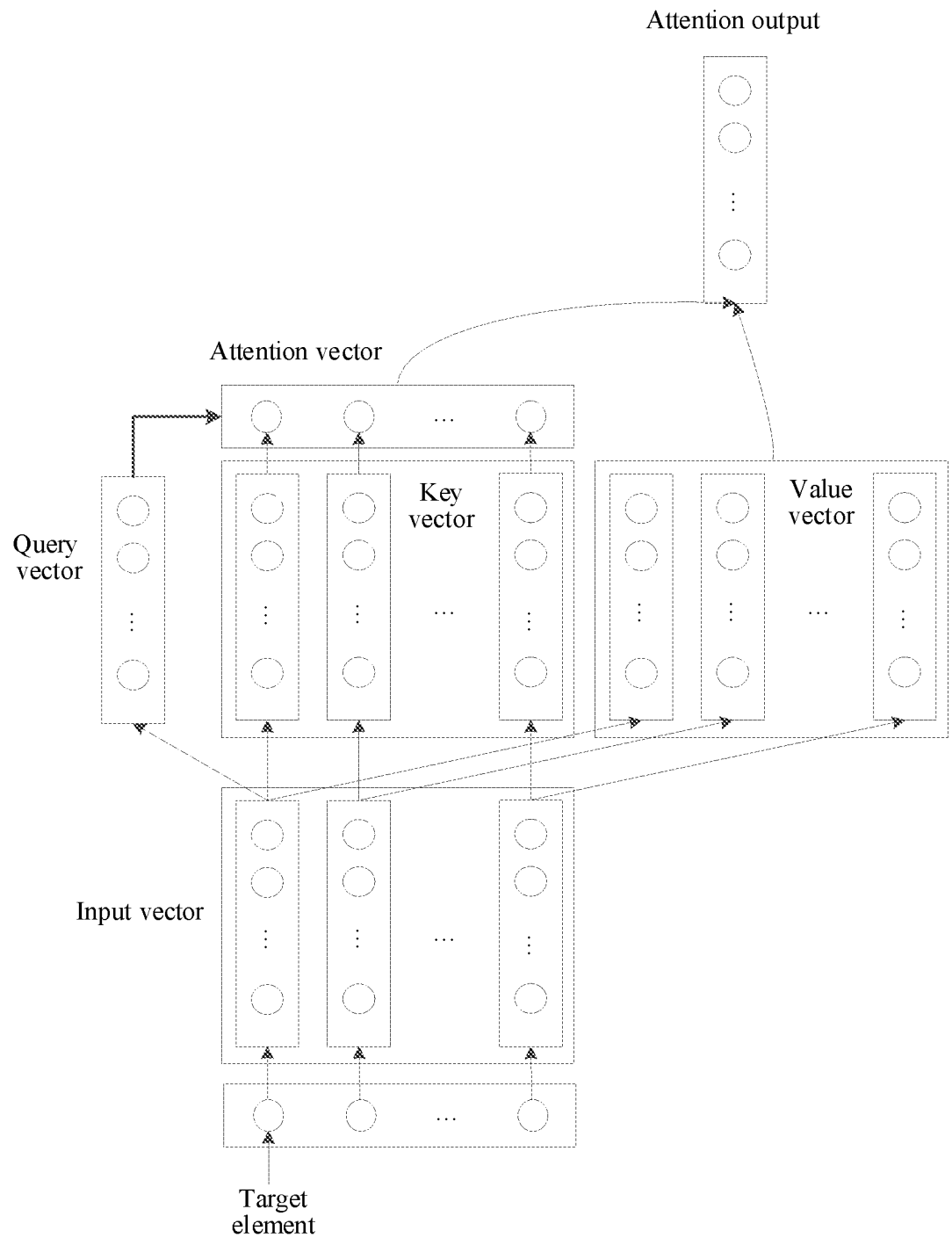
FIG. 3 is a schematic diagram of an attention mechanism according to some embodiments of this application.

FIG. 3 is a schematic diagram of an attention mechanism according to some embodiments of this application. In FIG. 3, a calculation process of the attention mechanism is described by using the first element (a word, a phrase, or a specific symbol) inputted as an example.

As shown in FIG. 3, the inputted first element is used as a target element, and the first network node in the first-layer encoder network corresponding to the first element is used as a target network node. The attention mechanism uses a semantic vector representation of the target element and each element of a context as an input. First, a Query vector of the target element, a Key vector of each element in the context, and original Value vectors of the target element and each element in the context are obtained through a specific matrix transformation. Specifically, for the target element, the Query vector is created based on the trained transformation matrix $W^Q$, and for the target element and each element in the context, the Key vector and the Value vector are created based on the trained transformation matrices $W^K$ and $W^V$ respectively. For example, these vectors are obtained by multiplying input vectors by the three trained transformation matrices $W^Q$, $W^K$, and $W^V$ respectively. Assuming that the input provided to the first encoder network is $X=(x_1, x_2, \ldots, x_n)$, where the vector of the first element is $x_1$, then the Query vector $q_1$ corresponding to $x_1$, the Key vector $k_i$ of each element in the context, and the original Value vector $v_i$ of the target element and each element in the context may be calculated according to the following formula:

$$q_1 = x_1 \times W^Q,$$
$$k_i = x_i \times W^K,$$
$$v_i = x_i \times W^V,$$

where i is an integer from 1 to n.

Then, based on the Query vector and the Key vector, an attention vector $A_1^1=(a_{11}^1, a_{12}^1, \ldots, a_{1n}^1)$ of the first network node (that is, the target network node) in the first-layer encoder network is calculated, where each element in the attention vector $A_1^1$ of the target network node indicates an attention weight from the target network node to each network node in the context (that is, each network node in the same layer). For example, $a_{1i}^1$ represents an attention weight from the first network node to an $i^{th}$ network node in the same layer in the first-layer encoder network. $a_{1i}^1$ may be obtained by multiplying $q_1$ by $k_i$ and then normalization through the softmax function. Finally, an attention output of the target element is obtained based on the attention vector $A_1^1$ and a Value vector V. For example, the attention output of the target network node may be calculated according to the following formula:

$$E_1^1 = A_1^1 \times V = \sum_{i=1}^{n} a_{1i}^1 \times v_i$$

In other words, the attention vector corresponding to the target network node is used as the weight, and the Value vector of the target element inputted to the target network node and the Value vectors of elements in the context are weighted and integrated as an encoded output of the target network node, that is, the enhanced semantic vector representation of the target element.

The attention output shown in FIG. 3 corresponds to the encoded output of the first network node in the first-layer encoder network in FIG. 2. When the first encoder network has only one layer of network nodes, the attention output shown in FIG. 3 is a final encoded output corresponding to the inputted first element. When the first encoder network has a plurality of layers of network nodes, the attention output of the first network node of the first layer shown in FIG. 3 is provided as an input to the first network node of the second-layer encoder network, and an encoded output of the first network node of the second-layer encoder network is obtained according to a similar method. Then, similar processing is repeated layer by layer until the last layer. An encoded output of the first network node in the last-layer encoder network is a final encoded output corresponding to the inputted first element.

It can be seen that, when the first encoder network has a plurality of layers of network nodes, for the inputted target element, the attention vector of the network node corresponding to the target element is calculated in each layer. In a current layer, the attention vector of the network node corresponding to the target element is used as the weight, weighted summation is performed on all vectors inputted to the layer, and the obtained weighted sum is used as an outputted encoded vector of the current layer that integrates semantics of a context. Then, the output of the current layer is further used as an input of a next layer, and the same processing is repeated. That is, assuming that the first encoder network has a total of L layers, and a target element is the inputted first element, then L attention vectors $A_1^1$, $A_1^2, \ldots,$ and $A_1^L$ corresponding to the target element are obtained, and the L attention vectors respectively correspond to L layers of the encoder network.

Then, a behavior trigger position in a text is determined based on an attention vector of a network node corresponding to a specific symbol. Each element in the attention vector of the network node corresponding to the specific symbol indicates an attention weight from the network node corresponding to the specific symbol to each network node in the same layer.

For example, assuming that the specific symbol is inserted before the text, the network node corresponding to the specific symbol is the first network node in each layer of the encoder network, and the attention vector of the network node corresponding to the specific symbol includes the attention vector of the first network node in each layer.

As described below, a behavior may include at least one of an action and an expression. Because a virtual image shows a corresponding expression or action based on a text, it is not only necessary to determine based on the text a specific content of the behavior that the virtual image is to present, but also necessary to determine an element (word/phrase) of the text, where the virtual image is to present a corresponding behavior when an audio corresponding to the element (word/phrase) is played. An element position that corresponds to a moment when the virtual image presents the corresponding behavior and is in the text is the behavior trigger position.

As described above, in the BERT model, based on the attention mechanism, a semantic representation of a target word/phrase is enhanced by using contextual word/phrase information. Moreover, in the BERT model according to this application, a CLS symbol for representing text classification is further inserted. Compared with other words/phrases included in the text, the inserted CLS symbol does not have obvious semantic information. Therefore, this symbol without obvious semantic information integrates semantic information of words/phrases in the text with less bias. Therefore, the weight value of each element in the attention vector of the network node corresponding to the CLS symbol can reflect the significance of each word/phrase in the text. A larger attention weight value indicates greater significance of the corresponding word/phrase.

In the method according to this application, it is considered appropriate to control the virtual image to present the corresponding behavior at a position where a word/phrase has the greatest significance in the text. Therefore, the position where a word/phrase has the greatest significance in the text is used as the behavior trigger position. Because the attention vector of the network node corresponding to the specific symbol can reflect the significance of each word/phrase in the text, the behavior trigger position in the text may be determined based on the attention vector of the network node corresponding to the specific symbol.

Specifically, when the first encoder network has only one layer of network nodes, the behavior trigger position in the text is determined based on the attention vector of the network node corresponding to the specific symbol. Assuming that the specific symbol corresponds to the first input vector, the network node corresponding to the specific symbol is the first network node. In addition, assuming that the attention vector of the first network node $A_1=(a_{11}, a_{12}, \ldots, a_{1n})$, the behavior trigger position p may be calculated according to the following formula:

$$p = \mathrm{argmax}_i(a_{1i})$$

The formula indicates that an index i of $a_{1i}$ of a maximum value is assigned to p.

When the first encoder network has a plurality of layers of network nodes, the determining a behavior trigger position in the text based on an attention vector of a network node corresponding to the specific symbol in S102 further includes: calculating an average value of attention vectors from a network node corresponding to the specific symbol to network nodes in all layers of the first encoder network to obtain an average attention vector; and determining the behavior trigger position based on an index position of an element with a maximum value in the average attention vector.

Specifically, as described above, when the first encoder network has a plurality of layers of network nodes, there is a network node corresponding to the specific symbol in each layer, and the attention vector of the network node corresponding to the specific symbol is calculated in each layer. Assuming that the first encoder network has a total of L layers, L attention vectors $A_1^1, A_1^2, \ldots,$ and $A_1^L$ of L network nodes corresponding to the specific symbol are obtained. In this case, the L attention vectors are first averaged to obtain an average attention vector $A_1^{ave}$:

$$A_1^{ave} = \frac{1}{L}\sum_{i=1}^{L} A_1^i = \frac{1}{L}\sum_{i=1}^{L}(a_{11}^i, a_{12}^i, \ldots, a_{1n}^i) =$$
$$\left(\frac{1}{L}\sum_{i=1}^{L} a_{11}^i, \frac{1}{L}\sum_{i=1}^{L} a_{12}^i, \ldots, \frac{1}{L}\sum_{i=1}^{L} a_{1n}^i\right)$$
$$= (a_{11}^{ave}, a_{12}^{ave}, \ldots, a_{1n}^{ave})$$

Then, the behavior trigger position is determined according to the following formula:

$$p = \mathrm{argmax}_i(a_{1i}^{ave})$$

The formula indicates that an index i of $a_{1i}^{ave}$ of a maximum value is assigned to p.

The foregoing describes how to determine a behavior trigger position of a virtual image based on a first encoder network. After the behavior trigger position of the virtual image is determined, it is also necessary to determine a behavior content that the virtual image needs to present.

S103: Determine a behavior content corresponding to the text based on an encoded vector that is outputted from the first encoder network and corresponds to the specific symbol.

As described above, the first encoder network outputs a plurality of first encoded vectors that correspond to the input vectors and integrate semantics of elements of a context. Because the specific symbol CLS without obvious semantic information is inserted into the input provided to the first encoder network, and the symbol without obvious semantic information integrates semantic information of words/phrases in the text with less bias, the first encoded vector corresponding to the specific symbol is used as semantic representation of the entire sentence of text for text classification.

Figure 4:
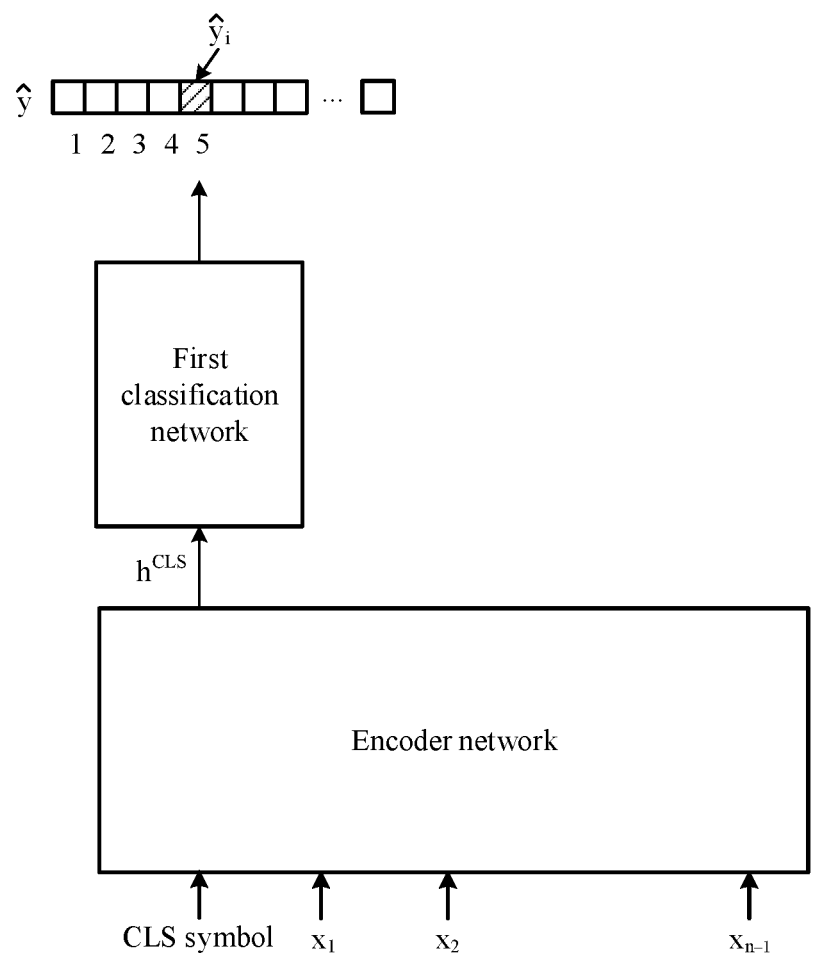
FIG. 4 is a schematic diagram of input and output of a first encoder network and a first classification network according to some embodiments of this application.
Figure 5:
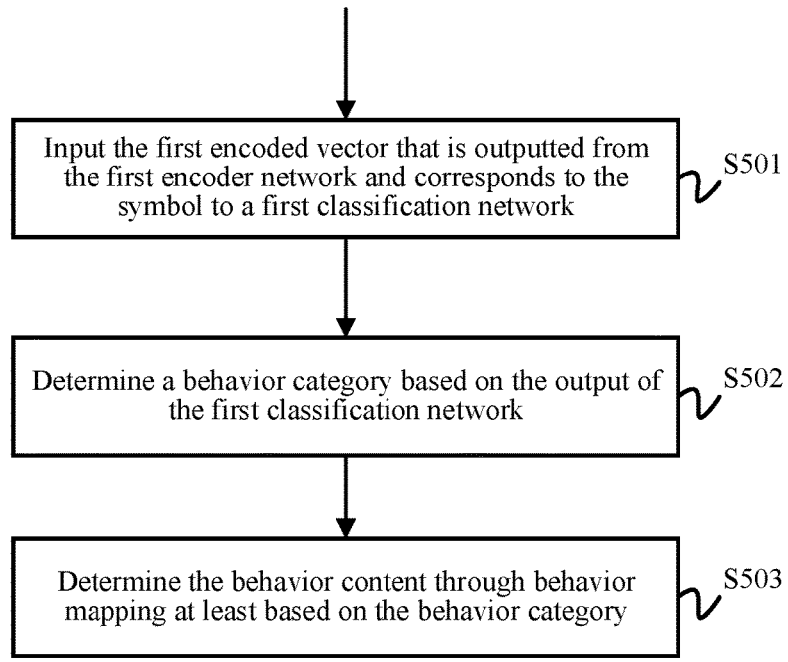
FIG. 5 is a flowchart of a specific process of S103 in FIG. 1.

FIG. 4 is a schematic diagram of input and output of a first encoder network and a first classification network according to some embodiments of this application. FIG. 5 shows a specific process of S103 in FIG. 1.

As shown in FIG. 5, the determining a behavior content based on a first encoded vector that is outputted from the first encoder network and corresponds to the specific symbol further includes the following operations:

As shown in FIG. 4, S501: Input the first encoded vector $h^{CLS}$ that is outputted from the first encoder network and corresponds to the specific symbol to a first classification network (feedforward neural network+softmax). The first classification network may be a single-layer neural network or a multi-layer neural network. In addition, when there are a plurality of categories to be classified, the first classification network may be adjusted to have more output neurons, and then the categories are normalized to a value ranging from 0 to 1 through the softmax function. Specifically, an output ŷ of the first classification network is a behavior prediction vector with the same dimension as the quantity of behavior categories, and each element represents a probability value that the text corresponds to the corresponding behavior category.

It is assumed that a text sequence is $X=(x_1, x_2, \ldots, x_n)$, where $x_i$ is an $i^{th}$ element (word/phrase) in a sentence X, and the CLS symbol is inserted before the text, vectors corresponding to the CLS symbol and the text are inputted into the BERT model to obtain an output vector corresponding to the CLS symbol:

$$h^{CLS}=BERT(X)[0]$$

S502: Determine a behavior category based on the output ŷ of the first classification network. Specifically, $h^{CLS}$ is provided as an input vector to the first classification network, and the first classification network may output a probability value that the text corresponding to each behavior category:

$$ŷ=softmax(Wh^{CLS}+b)$$

where W represents a weight of the network node in the first classification network, and b is an offset constant. A category i corresponding to a maximum probability in ŷ is the behavior category to which the text belongs. FIG. 4 shows a case that a probability value that the 5th element is the largest, that is, i=5.

Alternatively, in another one embodiment, the determining a behavior category based on the output of the first classification network may include: determining a maximum probability value in the behavior prediction vector; and when the maximum probability value is greater than a predetermined threshold, determining a behavior category corresponding to the maximum probability value as the behavior category corresponding to the text; or when the maximum probability value is less than or equal to a predetermined threshold, determining a specific category different from the behavior category corresponding to the maximum probability value as the behavior category corresponding to the text.

That is, when the behavior category to which the text belongs is determined, a confidence level of a behavior prediction result of the first classification network is further determined. If the maximum probability value $ŷ_i$ is less than the predetermined threshold, it is considered that the confidence level of the behavior prediction result outputted by the first classification network is low. In this case, the prediction result of the first classification network is not used, but the behavior category to which the text belongs is determined as a specific category different from the behavior category corresponding to the maximum probability value. For example, the specific category may be a neutral category. In another aspect, if the maximum probability value $ŷ_i$ is greater than the predetermined threshold, it is considered that the confidence level of the behavior prediction result outputted by the first classification network is high. In this case, the prediction result of the first classification network is used.

S503: Determine the behavior content through specific behavior mapping at least based on the behavior category.

For example, the specific behavior mapping includes a behavior mapping table. The behavior content may be determined based on the behavior category by searching the preset mapping table. Specifically, the determining the behavior content through specific behavior mapping at least based on the behavior category further includes searching the behavior mapping table for a behavior content corresponding to the behavior category, and determining the same as the behavior content.

The specific behavior mapping is different for different application scenarios of the virtual image. For example, a mapping table corresponding to a news scenario does not trigger relatively exaggerated a behavior content.

The foregoing describes in detail that the text is provided to the first encoder network, and the behavior trigger position is estimated based on the attention mechanism of the first encoder network. In addition, the output vector of the first encoder network is further inputted to the first classification network, and the prediction result of the behavior category to which the text belongs is obtained from the first classification network. For example, the first encoder network may be implemented by using the BERT model.

Both the first encoder network and the first classification network above need to be trained.

The BERT model is usually pre-trained by using a large-scale text corpus that is not related to a specific NLP task, which has a purpose of learning what language itself is supposed to be. This is like when we study Chinese, English, and other language courses, it is necessary to learn how to choose and combine mastered vocabulary to generate a coherent text. A pre-training process of the BERT model is to gradually adjust model parameters, so that semantic representation of text outputted by the model can describe the essence of language, to facilitate subsequent fine-tuning for a specific NLP task. For example, a character-based Chinese BERT model may be pre-trained by using a Chinese news corpus having a size of about 200 G.

In this application, the specific NLP task is a text classification task. In this case, the pre-trained BERT model and the first classification network are jointly trained. In the joint training phase, the focus is the training of the first classification network, and the changes in the BERT model are very small. The training process is referred to as fine-tuning. The training process of the first classification network involves supervised learning in ML. This means that a marked data set is required to train the model. In one embodiment, Weibo data with an emoji mark may be captured as the marked data set. Specifically, in the Weibo data, a text posted by a user usually includes a corresponding emoji expression. In one example, if there is an emoji expression with a smile in a sentence of text, a category of the emoji expression with a smile may be used as a correct expression category of the text. In another example, if there is an emoji action with a Kung Fu salute in a sentence of text, a category of the emoji action with a Kung Fu salute may be used as a correct expression category of the text. In addition, similar to the training of other classification networks, the optimization of the first classification network may be obtained by minimizing a cross-entropy loss function.

The behavior content may include at least one of an action content and an expression content. For example, the behavior content may include only an action content, or only an expression content, or both an action content and an expression content. For example, the action content may include, but is not limited to a finger heart, a bow, a grimace, a yawn, nose picking, and the like. The expression content may include, but is not limited to a smile, a frown, a slight, a laugh, and the like.

When the behavior content includes both action content and expression content, the first encoder network described above may further include a third encoder subnetwork corresponding to actions and a fourth encoder subnetwork corresponding to expressions. The inputting the plurality of input vectors to a first encoder network, and determining a behavior trigger position in the text based on an attention vector of a network node corresponding to the specific symbol further includes: inputting the plurality of input vectors to the third encoder subnetwork, the third encoder subnetwork including at least one layer of network nodes, and determining an action trigger position in the text based on an attention vector of a network node that corresponds to the specific symbol and is in the third encoder subnetwork; and inputting the plurality of input vectors to the fourth encoder subnetwork, the fourth encoder subnetwork including at least one layer of network nodes, and determining an expression trigger position in the text based on an attention vector of a network node that corresponds to the specific symbol and is in the fourth encoder subnetwork.

The two encoder subnetworks have the same quantity of parameters, but values of the parameters are different. The specific structure and configuration are similar to the first encoder network described above, and details are not described herein again. Therefore, for the same text, based on different encoder subnetworks, obtained action trigger position and expression trigger position are different. Correspondingly, the first classification network further includes a third classification subnetwork corresponding to actions and a fourth classification subnetwork corresponding to expressions. The two classification subnetworks have the same quantity of parameters, but values of the parameters are different. The specific structure and configuration are similar to those of the first classification network described above, and details are not described herein again.

Moreover, when the behavior content includes both an action content and an expression content, an expression mapping table and an action mapping table may be preset, the expression mapping table is then searched based on an expression category and a behavior category to determine a corresponding expression content, and the action mapping table is searched based on the expression category and the behavior category to determine a corresponding action content.

In addition to the behavior category, an emotion category to which the text belongs may be further determined based on the text. In this case, the method according to this application may further include the following operations: inputting the plurality of input vectors to a second encoder network; inputting a second encoded vector that is outputted from the second encoder network and corresponds to the specific symbol to a second classification network; and determining an emotion category based on an output of the second classification network. For example, the emotion category may include, but is not limited to angry, happy, and the like. The second encoder network is similar to the first encoder network, and the two networks have the same quantity of parameters, but values of the parameter may be the same or different as required. For example, when the behavior content includes only an expression content, the parameters of the first encoder network and the second encoder network may be the same. Alternatively, when the behavior content includes only an action content, the parameters of the first encoder network and the second encoder network may be different.

Similar to the first encoder network and the first classification network described above, the second encoder network and the second classification network also need to be trained, and a training method is similar to the training method described above. Weibo data with an emoji expression may be used as marked data for training the emotion category.

In this case, the determining the behavior content through specific behavior mapping at least based on the behavior category further includes determining the behavior content through specific behavior mapping based on the behavior category and the emotion category.

If the behavior category is used as an independent variable and the behavior content is used as a dependent variable, then the emotion category may be used as a dimension of an independent variable further added based on the behavior category for determining a final a behavior content.

Figure 6:
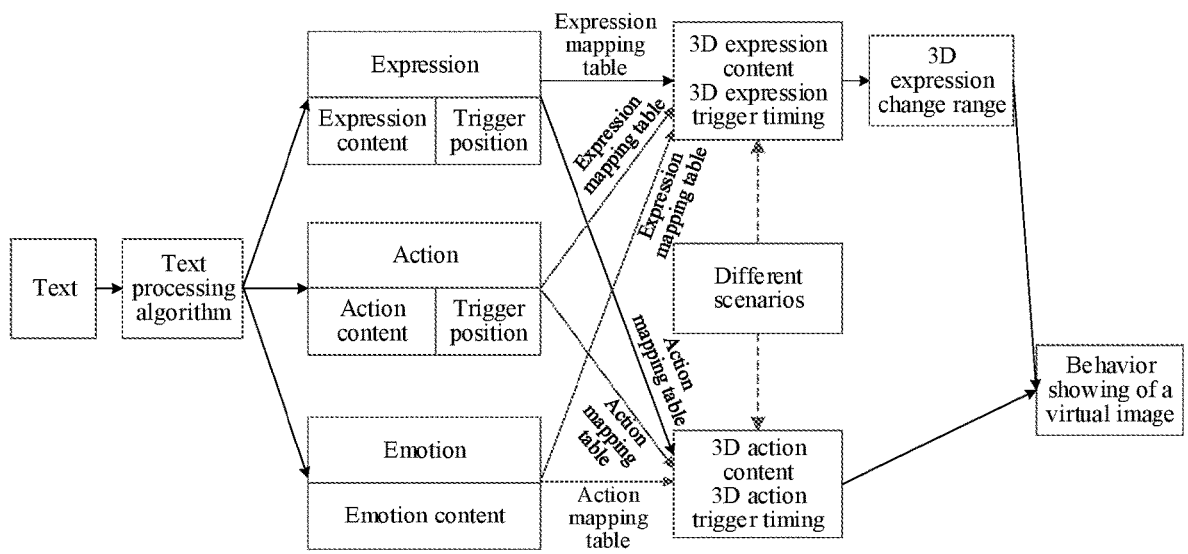
FIG. 6 is a flowchart of a product for behavior control of a virtual image according to an embodiment of this application.

FIG. 6 is a flowchart of a product for behavior control of a virtual image according to an embodiment of this application. FIG. 6 shows such an embodiment in which the behavior content may include both an action content and an expression content, and an action category, an expression category, and an emotion category and a corresponding action trigger position and expression trigger position are extracted separately based on a text.

First, the text is processed by using an algorithm to obtain an expression, an action, and an emotion corresponding to each sentence of the text. For example, the expression and action may be an emoji expression and action. Certainly, more expressions and actions may also be added to provide more varied outputted expressions and actions. The emotion is an emotion class such as angry and happy included in the text. The trigger of the expression and action is accurate to a word or a phrase. That is, a word or phrase in the text triggers a specified action and expression.

Then, after a preliminary expression and action are determined based on the algorithm, an expression and an action content that are to be triggered by the current text are determined by using an action mapping table and an expression mapping table. All three parameters including the action, expression, and emotion may be not necessarily obtained from each sentence of the text. Therefore, there may be seven cases: an action only, an expression only, an emotion only, an action and an expression, an action and an emotion, an expression and an emotion, and all the three. FIG. 7 is an example of an expression mapping table. The example shown in FIG. 7 corresponds to a case of all three parameters including an action, an expression, and an emotion. A corresponding existing live streaming expression ID represents an expression to be presented by a virtual image. An action ID, an expression ID, and an emotion ID respectively correspond to an action, an expression, and an emotion that are determined based on the text.

Figure 8:
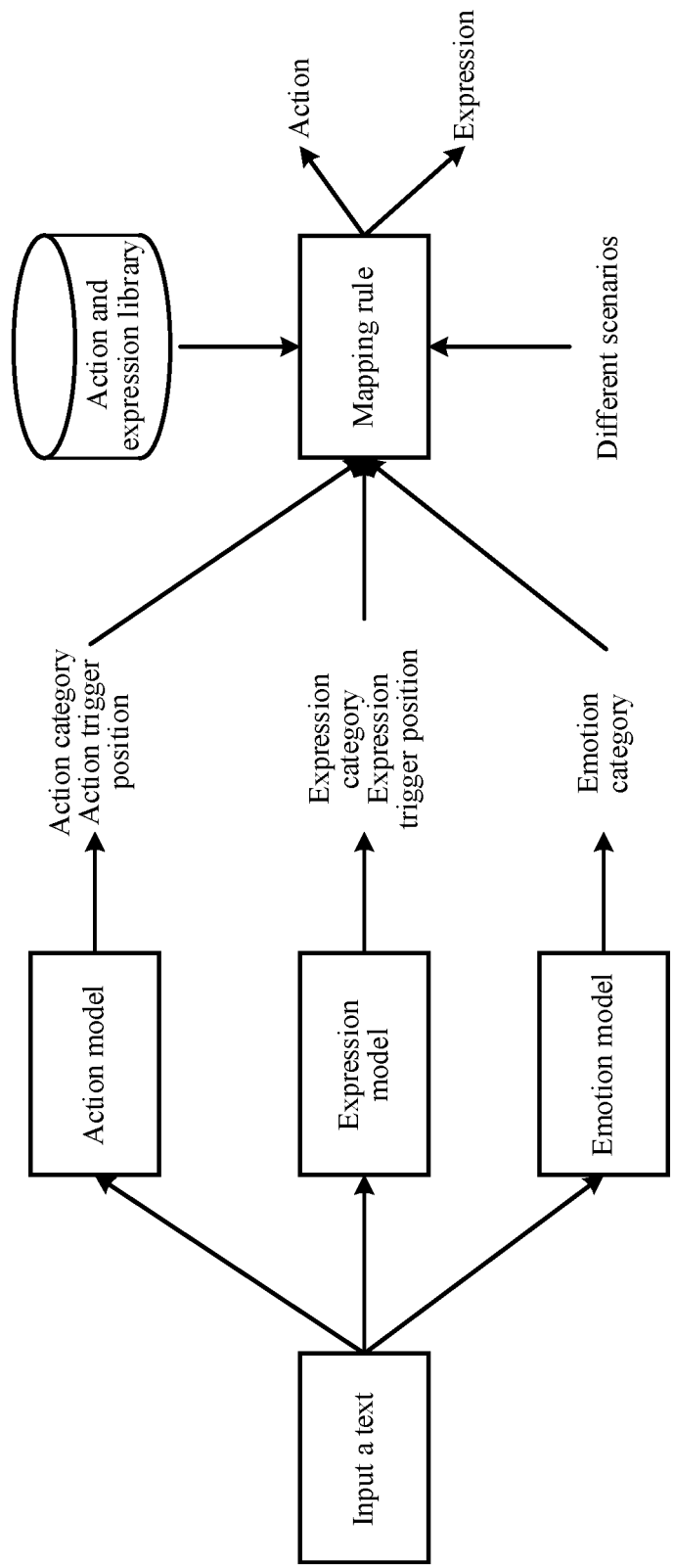
FIG. 8 is a schematic diagram of a behavior generation procedure according to an embodiment of this application.

FIG. 8 is a schematic diagram of a behavior generation procedure according to an embodiment of this application. In the embodiment shown in FIG. 8, the behavior includes both an action and an expression, and an action category, an expression category, and an emotion category and a corresponding action trigger position and expression trigger position are extracted separately based on a text. Then, based on the action category, expression category, and emotion category, the action content and the expression content that the virtual image is to present are determined according to a specific mapping rule. Both an action model and an expression model in FIG. 8 may be implemented by the first encoder network and the first classification network described above, but corresponding specific network parameters are different depending on a specific action model, expression model, and emotion model.

The mapping rule herein may be further selected by combining a current scenario where the virtual image is located. For example, a mapping rule corresponding to a news scenario does not trigger relatively exaggerated actions and expressions.

In addition, although FIG. 8 shows the action model, expression model, and emotion model, this application is not limited thereto as described above. For example, extraction of only an action category, extraction of only an expression category, extraction of an action category and an emotion category, extraction of an expression category and an emotion category, extraction of an action category and an expression category, and other combination variants based on a text are also included in the scope of this application.

Referring back to FIG. 1, finally, after the behavior content and the behavior trigger position are determined, in S104, an audio corresponding to the text is played, and the virtual image is controlled to present the behavior content when the audio is played to the behavior trigger position.

In consideration of behaviors (for example, expressions) performed by a real person during speaking change continuously and naturally, when the virtual image is controlled to present the behavior content, the triggered behavior may be further fine-tuned.

Specifically, the controlling the virtual image to present the behavior content further includes adjusting behavior change parameters of the virtual image based on the behavior content, so that the virtual image changes smoothly from not presenting the behavior content to presenting the behavior content. For example, each behavior change parameter may be adjusted. The adjustable behavior change parameters include, but are not limited to, a behavior start time, a behavior end time, and a behavior change coefficient, to ensure that each behavior change is naturally continuous and personified. The following Table 1 is an example of program code used to adjust behavior change parameters. In this code, an expression is used as an example. A specific adjustment parameter setting is shown, including waiting a predetermined period of time to show the expression, making the expression fade in, keeping the expression for a period of time, making the expression fade out, and the like, to ensure that each expression change is naturally continuous and personified.

TABLE 1

```
private static readonly double +[ ] DefaultRandomRanges = {
 0, 0.5 /*Wait 0s to 0.5s to show the expression*/,
 0.3, 0.5 /*The expression fades in (the expression gradually appears)
within a duration of 0.3s to 0.5s*/,
 0.75, 1 /*A ratio of a final degree of the expression to a customized
expression coefficient is between 0.75 and 1*/,
 0.5, 1 /*The expression is kept for 0.5s to 1s*/,
 0.3, 0.5 /*The expression fades out (the expression gradually disappears)
within a duration of 0.15s to 0.3s*/,
 0.1, 0.25 /*A ratio of a restored degree of the expression to a customized
expression coefficient is between 0.1 and 0.3*/,
 2, 4 /*The expression is kept for 2s to 4s before a next micro expression
(if any)*/
};
```

TABLE 1-continued

```
private static readonly double [ ] BlinkEyesDefaultRandomRanges = {
 0, 0.5 /* Wait 0s to 0.5s to show the expression*/,
 0.167, 0.167 /*The expression fades in (the expression gradually appears)
within a duration of 0.167s*/,
 1, 1 /*A degree to which the expression fades in is 100%*/,
 0, 0 /*The expression is not kept*/,
 0.167, 0.167 /*The expression fades out (the expression gradually
disappears) within a duration of 0.167s*/,
 0, 0 /*The expression fades out to disappear completely*/,
 2, 4 /*The expression is kept for 2s and 4s before a next micro
expression (if any)*/
};
```

In the foregoing, the method for behavior control of a virtual image based on a text according to this application is described in detail with reference to FIG. 1 to FIG. 8. It can be seen that, in the method according to this application, instead of driven by a human, a virtual image is driven to present corresponding behaviors by data, thereby implementing uninterrupted operation and virtual image customization. In addition, different categories of data are extracted based on a text and is then mapped to behaviors of the virtual image, so that the triggered behaviors are conform to the current text and the behaviors are more varied. Moreover, the behavior presented by the virtual image is determined based on a predetermined mapping rule. Therefore, this application is highly extensible and can continuously provide more varied behavior contents. In addition, it is only necessary to update the mapping rule to enable the virtual image to present a new behavior.

In addition, in this application, when the BERT model is used to implement the first encoder network, the behavior trigger position can be estimated based on the attention mechanism, and the accuracy of text classification can be improved. Table 2 below shows the accuracy of a BERT model-based text classification model and a CNN-based text classification model in the classification of actions, expressions, and emotions.

TABLE 2

| Method/Task | Action | Expression | Emotion |
| --- | --- | --- | --- |
| CNN | 82.53% | 74.38% | 65.69% |
| BERT | 87.23% | 85.40% | 77.14% |

Figure 9:
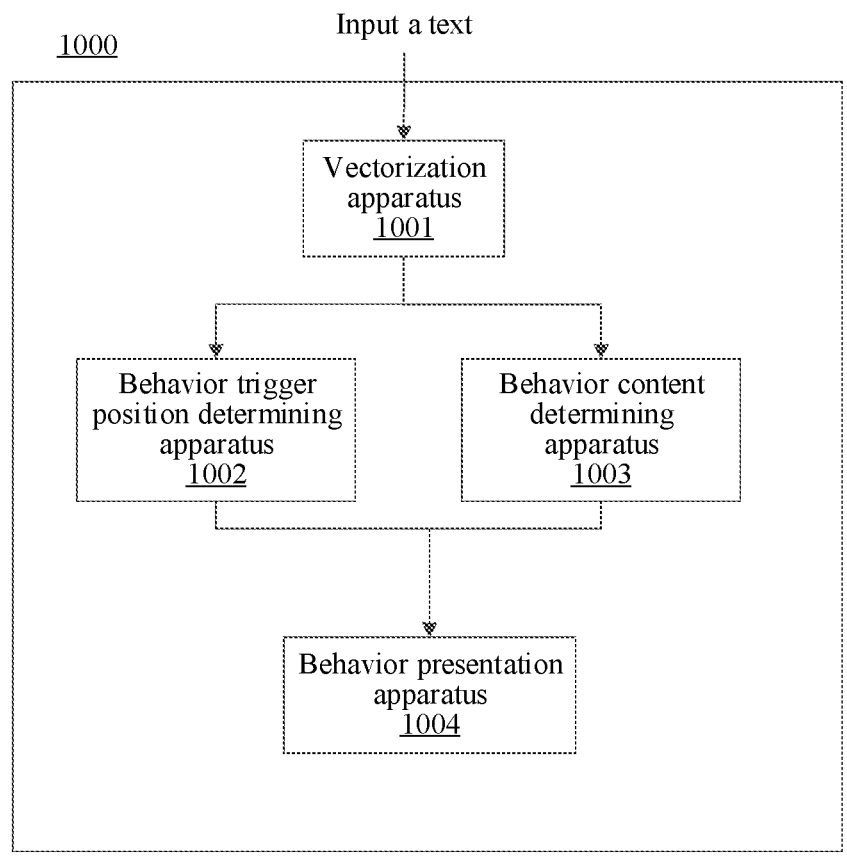
FIG. 9 is a functional block diagram of a configuration of a device for behavior control of a virtual image based on a text according to an embodiment of this application.

Next, a device for behavior control of a virtual image based on a text according to an embodiment of this application is described with reference to FIG. 9. As shown in FIG. 9, the device 1000 includes: a vectorization apparatus 1001, a behavior trigger position determining apparatus 1002, a behavior content determining apparatus 1003, and a behavior presentation apparatus 1004.

The vectorization apparatus 1001 is configured to: insert a specific symbol in a text, and generate a plurality of input vectors corresponding to the specific symbol and elements in the text, the specific symbol being a symbol used for representing text classification.

The text herein is usually a sentence. In addition, for example, the specific symbol may be a CLS symbol used for representing text classification. In addition, an insertion position of the specific symbol in the text may be arbitrary. For example, the specific symbol may be inserted before the text, or may be inserted after the text, or may be inserted in the middle of the text.

After the specific symbol is inserted, the vectorization apparatus 1001 segments elements included in the text. For example, the elements may be words or phrases. That is, the text may be segmented by words. Alternatively, the text may be segmented by phrases. Then, the vectorization apparatus 1001 converts the specific symbol and the elements in the text into a series of vectors that can express semantics of the text. That is, the vectorization apparatus maps or embeds the specific symbol and the elements in the text into another numerical vector space, to generate the plurality of corresponding input vectors.

The behavior trigger position determining apparatus 1002 is configured to: input the plurality of input vectors to a first encoder network, the first encoder network including at least one layer of network nodes, and determine a behavior trigger position in the text based on an attention vector of a network node corresponding to the specific symbol, each element in the attention vector indicating an attention weight from the network node corresponding to the specific symbol to each network node in the same layer as the network node. For example, the first encoder network may be implemented by using a BERT model.

As described above, because a virtual image shows a corresponding expression or action based on a text, it is not only necessary to determine based on the text a specific content of the behavior that the virtual image is to present, but also necessary to determine an element (word/phrase) of the text, where the virtual image is to present a corresponding behavior when an audio corresponding to the element (word/phrase) is played. An element position that corresponds to a moment when the virtual image presents the corresponding behavior and is in the text is the behavior trigger position.

In the BERT model, based on the attention mechanism, a semantic representation of a target word/phrase is enhanced by using contextual word/phrase information. Moreover, in the BERT model according to this application, a CLS symbol for representing text classification is further inserted. Compared with other words/phrases included in the text, the inserted CLS symbol does not have obvious semantic information. Therefore, this symbol without obvious semantic information integrates semantic information of words/phrases in the text with less bias. Therefore, the weight value of each element in the attention vector of the network node corresponding to the CLS symbol can reflect the significance of each word/phrase in the text. A larger attention weight value indicates greater significance of the corresponding word/phrase.

In the device according to this application, it is considered appropriate to control the virtual image to present the corresponding behavior at a position where a word/phrase has the greatest significance in the text. Therefore, the behavior trigger position determining apparatus 1002 uses the position where a word/phrase has the greatest significance in the text as the behavior trigger position. Because the attention vector of the network node corresponding to the specific symbol can reflect the significance of each word/phrase in the text, the behavior trigger position determining apparatus 1002 may determine the behavior trigger position in the text based on the attention vector of the network node corresponding to the specific symbol.

Specifically, when the first encoder network has only one layer of network nodes, the behavior trigger position determining apparatus 1002 is further configured to: determine a behavior trigger position in the text based on an attention vector of a network node corresponding to the specific symbol.

When the first encoder network has a plurality of layers of network nodes, the behavior trigger position determining apparatus 1002 is further configured to: calculate, for each layer of the first encoder network, an attention vector of a network node corresponding to the specific symbol in the layer, and determine an average value of attention vectors in all layers to obtain an average attention vector; and determine the behavior trigger position based on an index position of an element with a maximum value in the average attention vector.

The behavior content determining apparatus 1003 is configured to determine a behavior content based on a first encoded vector that is outputted from the first encoder network and corresponds to the specific symbol.

As described above, the first encoder network outputs a plurality of first encoded vectors that correspond to the input vectors and integrate semantics of elements of a context. Because the specific symbol CLS without obvious semantic information is inserted into the input provided to the first encoder network, and the symbol without obvious semantic information integrates semantic information of words/phrases in the text with less bias, the outputted first encoded vector corresponding to the specific symbol is used as semantic representation of the entire sentence of text for text classification.

The behavior content determining apparatus 1003 is further configured to: input the first encoded vector that is outputted from the first encoder network and corresponds to the specific symbol to a first classification network; determine a behavior category corresponding to the text based on an output of the first classification network; and determine the behavior content through specific behavior mapping at least based on the behavior category.

The first classification network may be a single-layer neural network or a multi-layer neural network. In addition, when there are a plurality of categories to be classified, the first classification network may be adjusted to have more output neurons, and then the categories are normalized to a value ranging from 0 to 1 through the softmax function. Specifically, an output of the first classification network is a behavior prediction vector with the same dimension as the quantity of behavior categories, and each element represents a probability value that the text corresponds to the corresponding behavior category. The behavior content determining apparatus 1003 uses a category corresponding to a maximum probability in the behavior prediction vector as the behavior category to which the text belongs.

Alternatively, in another embodiment, the behavior content determining apparatus 1003 is further configured to determine a behavior category based on the output of the first classification network by performing the following processing: determining a maximum probability value in the behavior prediction vector; and when the maximum probability value is greater than a predetermined threshold, determining a behavior category corresponding to the maximum probability value as the behavior category corresponding to the text; or when the maximum probability value is less than or equal to a predetermined threshold, determining a specific category different from the behavior category corresponding to the maximum probability value as the behavior category corresponding to the text.

That is, when the behavior category to which the text belongs is determined, the behavior content determining apparatus 1003 further determines a confidence level of a behavior prediction result of the first classification network. If the maximum probability value is less than the predetermined threshold, the behavior content determining apparatus 1003 considers that the confidence level of the behavior prediction result outputted by the first classification network is low. In this case, the behavior content determining apparatus 1003 does not use the prediction result of the first classification network, but determines the behavior category to which the text belongs as a specific category different from the behavior category corresponding to the maximum probability value. For example, the specific category may be a neutral category. In another aspect, if the maximum probability value is greater than the predetermined threshold, the behavior content determining apparatus 1003 considers that the confidence level of the behavior prediction result outputted by the first classification network is high. In this case, the behavior content determining apparatus 1003 uses the prediction result of the first classification network.

Finally, the behavior content determining apparatus 1003 determines the behavior content through specific behavior mapping at least based on the behavior category. For example, the behavior content may be determined based on the behavior category by searching the preset mapping table.

As described above, the behavior content may include at least one of an action content and an expression content. For example, the behavior content may include only an action content, or only an expression content, or both an action content and an expression content. For example, the action content may include, but is not limited to a finger heart, a bow, a grimace, a yawn, nose picking, and the like. The expression content may include, but is not limited to a smile, a frown, a slight, a laugh, and the like.

When the behavior content includes both an action content and an expression content, the first encoder network described above may further include a third encoder subnetwork corresponding to actions and a fourth encoder subnetwork corresponding to expressions. The two encoder subnetworks have the same quantity of parameters, but values of the parameters are different. The specific structure and configuration are similar to those of the encoder network described above, and details are not described herein again. Therefore, for the same text, based on different encoder subnetworks, obtained action trigger position and expression trigger position are different. Correspondingly, the first classification network further includes a third classification subnetwork corresponding to actions and a fourth classification subnetwork corresponding to expressions. The two classification subnetworks have the same quantity of parameters, but values of the parameters are different. The specific structure and configuration are similar to those of the first classification network described above, and details are not described herein again.

Moreover, when the behavior content includes both an action content and an expression content, an expression mapping table and an action mapping table may be preset, and the behavior content determining apparatus 1003 then searches the expression mapping table based on an expression category and a behavior category to determine a corresponding expression content, and searches the action mapping table based on the expression category and the behavior category to determine a corresponding action content.

In addition to the behavior category, an emotion category to which the text belongs may be further determined based on the text. In this case, the behavior content determining apparatus 1003 is further configured to: input the plurality of input vectors to a second encoder network; input a second encoded vector that is outputted from the second encoder network and corresponds to the specific symbol to a second classification network; and determine an emotion category to which the text belongs based on an output of the second classification network.

The behavior content determining apparatus 1003 is further configured to determine the behavior content through specific behavior mapping at least based on the behavior category by performing the following processing: determining the behavior content through specific behavior mapping based on the behavior category and the emotion category.

If the behavior category is used as an independent variable and the behavior content is used as a dependent variable, then the emotion category may be used as a dimension of an independent variable further added based on the behavior category for determining a final a behavior content.

Finally, after the behavior trigger position is determined by the behavior trigger position determining apparatus 1002 and the behavior content is determined by the behavior content determining apparatus 1003, the behavior presentation apparatus 1004 is configured to: play an audio corresponding to the text, and control the virtual image to present the behavior content when the audio is played to the behavior trigger position.

In consideration of behaviors (for example, expressions) performed by a real person during speaking change continuously and naturally, when the virtual image is controlled to present the behavior content, the behavior presentation apparatus 1004 may further fine-tune the triggered behavior.

Specifically, the behavior presentation apparatus 1004 may be further configured to adjust behavior change parameters of the virtual image based on the behavior content, so that the virtual image changes smoothly from not presenting the behavior content to presenting the behavior content. For example, the adjustable behavior change parameters include, but are not limited to, a behavior start time, a behavior end time, and a behavior change coefficient, to ensure that each behavior change is naturally continuous and personified.

It can be seen that, in the device according to this application, instead of driven by a human, a virtual image is driven to present corresponding behaviors by data, thereby implementing uninterrupted operation and virtual image customization. In addition, different categories of data are extracted based on a text and is then mapped to behaviors of the virtual image, so that the triggered behaviors are conform to the current text and the behaviors are more varied. Moreover, the behavior presented by the virtual image is determined based on a predetermined mapping rule. Therefore, this application is highly extensible and can continuously provide more varied behavior contents. In addition, it is only necessary to update the mapping rule to enable the virtual image to present a new behavior.

In addition, in this application, when the BERT model is used to implement the encoder network, the behavior trigger position can be estimated based on the attention mechanism, and the accuracy of text classification can be improved.

Because the device for behavior control of a virtual image according to the embodiments of this application completely corresponds to the method for behavior control of a virtual image described above, many details are not described in the description of the device for behavior control of a virtual image. A person skilled in the art may understand that all the details of the method for behavior control of a virtual image described above may be similarly applied to the device for behavior control of a virtual image.

Figure 10:
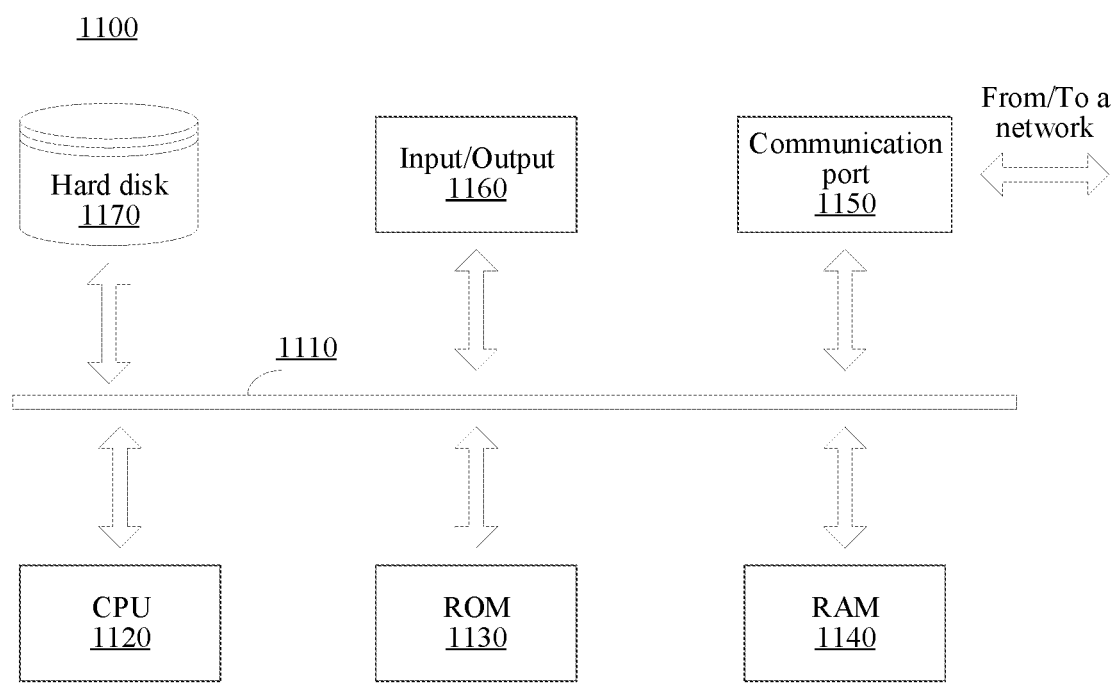
FIG. 10 is a schematic diagram of an architecture of an exemplary computing device according to an embodiment of this application.

In addition, the method or device according to the embodiments of this application may alternatively be implemented by using an architecture of a computing device 1100 shown in FIG. 10. As shown in FIG. 10, the computing device 1100 may include a bus 1110, one or more CPUs 1120, a read-only memory (ROM) 1130, a random access memory (RAM) 1140, a communication port 1150 connected to a network, an input/output component 1160, a hard disk 1170, and the like. A storage device, for example, the ROM 1130 or the hard disk 1170, in the computing device 1100 may store various data or files used in processing and/or communication in the method for behavior control of a virtual image provided in this application and program instructions executed by the CPU. Certainly, the architecture shown in FIG. 10 is only exemplary, and when different devices are implemented, one or more components in the computing device shown in FIG. 10 may be omitted according to specific needs.

The embodiments of this application may alternatively be implemented by a computer-readable storage medium. Computer-readable instructions are stored on the computer-readable storage medium according to an embodiment of this application. The computer-readable instructions, when executed by a processor, may perform the method for behavior control of a virtual image according to the embodiments of this application described with reference to the foregoing accompanying drawings. The computer-readable storage medium includes, but is not limited to, a volatile memory and/or a non-volatile memory. For example, the volatile memory may include a RAM and/or a high-speed cache. For example, the non-volatile memory may include a ROM, a hard disk, and a flash memory.

The method and device for behavior control of a virtual image according to each embodiment of this application have been described in detail with reference to FIG. 1 to FIG. 10. In the method and device for behavior control of a virtual image according to each embodiment of this application, instead of driven by a human, a virtual image is driven to present corresponding behaviors by data, thereby implementing uninterrupted operation and virtual image customization. In addition, different categories of data are extracted based on a text and is then mapped to behaviors of the virtual image, so that the triggered behaviors are conform to the current text and the behaviors are more varied. Moreover, the behavior presented by the virtual image is determined based on a predetermined mapping rule. Therefore, this application is highly extensible and can continuously provide more varied behavior contents. In addition, it is only necessary to update the mapping rule to enable the virtual image to present a new behavior.

The term module, unit, and other similar terms such as subunit, unit, submodule, etc., in this disclosure may refer to a software unit, a hardware unit, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each unit can be part of an overall module that includes the functionalities of the module.

In some embodiments, the term apparatus may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall module that includes the functionalities of the apparatus.

In this specification, the term "include", "comprise", or any other variant is intended to cover non-exclusive include, so that a process, a method, an article, or a device that includes a series of elements and that not only includes such elements, but also includes other elements not explicitly listed, or may further include elements inherent in the process, the method, the article, or the device. Unless otherwise specified, an element limited by "include . . . " does not exclude other same elements existing in the process, the method, the article, or the device that includes the element.

Finally, the foregoing series of processing not only include processing performed in the order described herein according to a time sequence, but also include processing performed in parallel or separately, rather than according to the time sequence.

Based on the foregoing description of the implementations, a person skilled in the art may clearly understand that this application may be implemented by using software in addition to a necessary hardware platform, or certainly, may be implemented by using software only. Based on such an understanding, all or the part of the technical solutions of this application contributing to the technology in the background part may be implemented in the form of a software product. The computer software product may be stored in a storage medium, such as a ROM/RAM, a magnetic disk, or an optical disc, and includes several instructions for instructing a computer device (which may be a personal computer, a server, or a network device) to perform the method described in the embodiments or some parts of the embodiments of this application.

This application is described above in detail. Although the principles and implementations of this application are described by using specific examples in this specification, the descriptions of the foregoing embodiments are merely intended to help understand the method and the core idea of the method of this application. Meanwhile, a person of ordinary skill in the art may make modifications to the specific implementations and application range according to the idea of this application. In conclusion, the content of this specification is not construed as a limit on this application.

What is claimed is:

1. A method for behavior control of a virtual image based on a text, performed by an electronic device, the method comprising:
   inserting a symbol in a text, and generating a plurality of input vectors corresponding to the symbol and elements in the text, the symbol being a symbol used for representing text classification;
   inputting the plurality of input vectors to a first encoder network, the first encoder network comprising at least one layer of network nodes, and determining a behavior trigger position in the text based on an attention vector of a network node corresponding to the symbol, each element in the attention vector indicating an attention weight from the network node corresponding to the symbol to each network node in the same layer as the network node;
   determining behavior content based on a first encoded vector that is outputted from the first encoder network and corresponds to the symbol; and playing an audio corresponding to the text, and controlling the virtual image to present the behavior content when the audio is played to the behavior trigger position.

2. The method according to claim 1, wherein the determining a behavior trigger position in the text based on an attention vector of a network node corresponding to the symbol comprises:
calculating, for each layer of the first encoder network, an attention vector of a network node corresponding to the symbol in the layer, and determining an average value of attention vectors in all layers to obtain an average attention vector; and
determining the behavior trigger position based on an index position of an element with a maximum value in the average attention vector.

3. The method according to claim 1, wherein the first encoder network outputs a plurality of first encoded vectors that correspond to the input vectors and integrate semantics of elements of a context; and
the determining a behavior content based on a first encoded vector that is outputted from the first encoder network and corresponds to the symbol comprises:
inputting the first encoded vector that is outputted from the first encoder network and corresponds to the symbol to a first classification network;
determining a behavior category corresponding to the text based on an output of the first classification network; and
determining the behavior content through behavior mapping based on the behavior category.

4. The method according to claim 3, wherein the behavior mapping comprises a behavior mapping table; and
the determining the behavior content through the behavior mapping based on the behavior category further comprises:
searching the behavior mapping table for a behavior content corresponding to the behavior category, and determining the same as the behavior content.

5. The method according to claim 3, wherein the behavior mapping is different for different application scenarios of the virtual image.

6. The method according to claim 3, wherein the output of the first classification network is a behavior prediction vector, a number of elements of the behavior prediction vector is the same as a quantity of behavior categories, and each element of the behavior prediction vector represents a probability value of the text corresponding to the corresponding behavior category.

7. The method according to claim 6, wherein the determining a behavior category corresponding to the text based on an output of the first classification network comprises:
determining a maximum probability value in the behavior prediction vector; and
when the maximum probability value is greater than a threshold, determining a behavior category corresponding to the maximum probability value as the behavior category corresponding to the text; or when the maximum probability value is less than or equal to a threshold, determining a category different from the behavior category corresponding to the maximum probability value as the behavior category corresponding to the text.

8. The method according to claim 3, further comprising: inputting the plurality of input vectors to a second encoder network;
inputting a second encoded vector that is outputted from the second encoder network and corresponds to the symbol to a second classification network; and
determining an emotion category corresponding to the text based on an output of the second classification network, wherein
the determining the behavior content through behavior mapping at least based on the behavior category further comprises:
determining the behavior content through behavior mapping based on the behavior category and the emotion category.

9. The method according to claim 1, wherein the behavior content comprises at least one of action content and expression content.

10. The method according to claim 9, wherein when the behavior content comprises both the action content and the expression content, the first encoder network comprises a third encoder subnetwork and a fourth encoder subnetwork; and
the inputting the plurality of input vectors to a first encoder network, and determining a behavior trigger position in the text based on an attention vector of a network node corresponding to the symbol further comprises:
inputting the plurality of input vectors to the third encoder subnetwork, the third encoder subnetwork comprising at least one layer of network nodes, and determining an action trigger position in the text based on an attention vector of a network node that corresponds to the symbol and is in the third encoder subnetwork; and
inputting the plurality of input vectors to the fourth encoder subnetwork, the fourth encoder subnetwork comprising at least one layer of network nodes, and determining an expression trigger position in the text based on an attention vector of a network node that corresponds to the symbol and is in the fourth encoder subnetwork.

11. The method according to claim 1, wherein the controlling the virtual image to present the behavior content further comprises:
adjusting behavior change parameters of the virtual image based on the behavior content, the virtual image smoothly changing from not presenting the behavior content to presenting the behavior content.

12. The method according to claim 11, wherein the behavior change parameters comprise at least one of the following: a behavior start time, a behavior end time, and a behavior change coefficient.

13. A device for behavior control of a virtual image based on a text, comprising:
a vectorization apparatus, configured to: insert a symbol in a text, and generate a plurality of input vectors corresponding to the symbol and elements in the text, the symbol being a symbol used for representing text classification;
a behavior trigger position determining apparatus, configured to: input the plurality of input vectors to a first encoder network, the first encoder network comprising at least one layer of network nodes, and determine a behavior trigger position in the text based on an attention vector of a network node corresponding to the symbol, each element in the attention vector indicating an attention weight from the network node corresponding to the symbol to each network node in the same layer as the network node;

a behavior content determining apparatus, configured to determine behavior content based on a first encoded vector that is outputted from the first encoder network and corresponds to the symbol; and a behavior presentation apparatus, configured to: play an audio corresponding to the text, and control the virtual image to present the behavior content when the audio is played to the behavior trigger position.

14. A non-transitory computer-readable recording medium, storing instructions, the instructions, when executed by a processor, causing the processor to perform the method, comprising:

inserting a symbol in a text, and generating a plurality of input vectors corresponding to the symbol and elements in the text, the symbol being a symbol used for representing text classification;

inputting the plurality of input vectors to a first encoder network, the first encoder network comprising at least one layer of network nodes, and determining a behavior trigger position in the text based on an attention vector of a network node corresponding to the symbol, each element in the attention vector indicating an attention weight from the network node corresponding to the symbol to each network node in the same layer as the network node;

determining behavior content based on a first encoded vector that is outputted from the first encoder network and corresponds to the symbol; and playing an audio corresponding to the text, and controlling the virtual image to present the behavior content when the audio is played to the behavior trigger position.

15. The computer-readable recording medium according to claim 14, wherein the determining a behavior trigger position in the text based on an attention vector of a network node corresponding to the symbol comprises:

calculating, for each layer of the first encoder network, an attention vector of a network node corresponding to the symbol in the layer, and determining an average value of attention vectors in all layers to obtain an average attention vector; and determining the behavior trigger position based on an index position of an element with a maximum value in the average attention vector.

16. The computer-readable recording medium according to claim 14, wherein the first encoder network outputs a plurality of first encoded vectors that correspond to the input vectors and integrate semantics of elements of a context; and the determining a behavior content based on a first encoded vector that is outputted from the first encoder network and corresponds to the symbol comprises:

inputting the first encoded vector that is outputted from the first encoder network and corresponds to the symbol to a first classification network;

determining a behavior category corresponding to the text based on an output of the first classification network; and determining the behavior content through behavior mapping based on the behavior category.

17. The computer-readable recording medium according to claim 16, wherein the behavior mapping comprises a behavior mapping table; and the determining the behavior content through the behavior mapping based on the behavior category further comprises:

searching the behavior mapping table for a behavior content corresponding to the behavior category, and determining the same as the behavior content.

18. The computer-readable recording medium according to claim 16, wherein the behavior mapping is different for different application scenarios of the virtual image.

19. The computer-readable recording medium according to claim 16, wherein the output of the first classification network is a behavior prediction vector, a number of elements of the behavior prediction vector is the same as a quantity of behavior categories, and each element of the behavior prediction vector represents a probability value of the text corresponding to the corresponding behavior category.

20. The computer-readable recording medium according to claim 19, wherein the determining a behavior category corresponding to the text based on an output of the first classification network comprises:

determining a maximum probability value in the behavior prediction vector; and when the maximum probability value is greater than a threshold, determining a behavior category corresponding to the maximum probability value as the behavior category corresponding to the text; or when the maximum probability value is less than or equal to a threshold, determining a category different from the behavior category corresponding to the maximum probability value as the behavior category corresponding to the text.

* * * * *